United States Patent
Grieb et al.

(10) Patent No.: US 8,078,322 B2
(45) Date of Patent: Dec. 13, 2011

(54) METHOD AND ARRANGEMENT FOR THE ONLINE REGULATION OF A BATCH PROCESS IN A BIOREACTOR

(75) Inventors: Herbert Grieb, Malsch (DE);
Karl-Heinz Kirchberg, Karlsruhe (DE);
Edmund Linzenkirchner, Eggenstein-Leopoldshafen (DE); Ingrid Maes, Zwijndrecht (BE);
Bernd-Markus Pfeiffer, Wörth (DE)

(73) Assignee: Siemens Aktiengesellschaft, Munich (DE)

( * ) Notice: Subject to any disclaimer, the term of this patent is extended or adjusted under 35 U.S.C. 154(b) by 1063 days.

(21) Appl. No.: 11/661,058

(22) PCT Filed: Aug. 23, 2005

(86) PCT No.: PCT/EP2005/009107
§ 371 (c)(1),
(2), (4) Date: Nov. 14, 2007

(87) PCT Pub. No.: WO2006/021427
PCT Pub. Date: Mar. 2, 2006

(65) Prior Publication Data
US 2008/0133044 A1 Jun. 5, 2008

(30) Foreign Application Priority Data
Aug. 23, 2004 (DE) .......................... 10 2004 040 774

(51) Int. Cl.
*G06F 13/02* (2006.01)
*C12Q 3/00* (2006.01)

(52) U.S. Cl. .............. 700/266; 700/28; 700/29; 700/30; 700/32; 702/19; 435/3

(58) Field of Classification Search ............... 435/289.1, 435/3; 700/28, 29, 32, 266–274; 436/55; 702/19
See application file for complete search history.

(56) References Cited

U.S. PATENT DOCUMENTS
4,025,763 A * 5/1977 Kleiss ............................ 700/43
(Continued)

FOREIGN PATENT DOCUMENTS
DE 196 53 530 C1 7/1998

OTHER PUBLICATIONS

Vaidyanathan S, Arnold SA, Matheson L, Mohan P, McNeil B, Harvey LM. Assessment of near-infrared spectral information for rapid monitoring of bioprocess quality. Biotechnology and Bioengineering, vol. 74, No. 5, 376-388, 2001.*

(Continued)

*Primary Examiner* — Dave Robertson

(57) ABSTRACT

The invention relates to the online regulation of a batch process in a bioreactor. According to the invention, spectra of the actual charge in the bioreactor are recorded at successive points during the running batch process. A measuring vector is produced, for each spectrum, in the low-dimensional main constituent region by the main constituent analysis of the high-dimensional spectra. The deviation is calculated between the measuring vector and a corresponding vector of a nominal trajectory consisting of measuring vectors of a reference charge, which are determined in an earlier batch process, and at least one adjustment operation for the batch process is determined and carried out according to said deviation. The direction of the adjustment operation is maintained when the deviation determined from one point to the next decreases, and modified when the deviation determined from one point to the next remains the same or increases.

10 Claims, 1 Drawing Sheet

U.S. PATENT DOCUMENTS

| | | | |
|---|---|---|---|
| 4,563,734 A * | 1/1986 | Mori et al. | 700/37 |
| 6,017,440 A * | 1/2000 | Lewis et al. | 205/777.5 |
| 6,284,196 B1 * | 9/2001 | Casal et al. | 422/62 |
| 6,490,573 B1 * | 12/2002 | Njemanze | 706/19 |
| 2008/0262795 A1 * | 10/2008 | Webb et al. | 702/184 |
| 2009/0104594 A1 * | 4/2009 | Webb | 435/3 |

OTHER PUBLICATIONS

S. Marose, C. Lindemann and T. Scheper, Two-dimensional fluorescence spectroscopy: A new tool for on-line bioprocess monitoring, Biotechnol. Progr. 14 (1998), pp. 63-74.*

Marian Navratil, Anna Norberg, Lars Lembren and Carl-Fredrik Mandenius, "On-line multi-analyzer monitoring of biomass, glucose and acetate for growth rate control of a *Vibrio cholerae* fed-batch cultivation", Journal of Biotechnology, Elsevier Science Publishers, Amsterdam, NL, vol. 115, No. 1, Jan. 12, 2005, pp. 67-79, XP004966990, Abstract.

Helen E. Johnson, David Broadhurst, Douglas B. Kell, Michael K. Theodorou, Rogert J. Merry and Gareth W. Griffith, "High-Throughput Metabolic Fingerprinting of Legume Silage Fermentations via Fourier Transform Infrared Spectroscopy and Chemometrics", Applied and Environmental Microbiology, vol. 70, No. 3, Mar. 2004, pp. 1583-1592, XP002354311.

Pia Jorgensen, Joan Gronkjaer Pedersen, Ejner Paaske Jensen, Kim H. Esbensen, On-line batch fermentation process monitoring (NIR)—introducing 'biological process time', Journal of Chemometrics, No. 18, 2004, pp. 1-11, XP002354312, Published online in Wiley InterScience (www.interscience.wiley.com), DOI: 10.102/cem850, Abstract.

Richard Escott, "Process Monitoring and Control—A Collaborative CPACT Project", CPACT News, No. 4, 2002, XP002354310.

* cited by examiner

METHOD AND ARRANGEMENT FOR THE ONLINE REGULATION OF A BATCH PROCESS IN A BIOREACTOR

CROSS REFERENCE TO RELATED APPLICATIONS

This application is the US National Stage of International Application No. PCT/EP2005/009107, filed Aug. 23, 2005 and claims the benefit thereof. The International Application claims the benefits of German application No. 10 2004 040 774.6 filed Aug. 23, 2004, both of the applications are incorporated by reference herein in their entirety.

FIELD OF INVENTION

The invention relates to the online regulation of a batch process in a bioreactor.

BACKGROUND OF THE INVENTION

In the life sciences industry (pharma, agro, food) many products are manufactured in bioreactors, e.g. fermenters, in a batch process. In such cases living micro-organisms in the bioreactor are caused by suitable environmental conditions, such as optimum temperature, pH value and introduction of raw materials and if necessary oxygen, to produce the desired product with the desired quality. Previously these environmental conditions have been measured in the bioreactor as far as possible and have been regulated or controlled in accordance with predetermined empirical values using conventional closed-loop or open-loop controllers. At the end of the batch process the product created is subjected to time-consuming investigations in the laboratory and, depending on its quality, released for further use or disposed of as waste. Since the product quality cannot be measured directly during the ongoing batch process and the micro-organisms as living beings exhibit strong variations as regards their electrophysiological state and their behavior, a large amount of waste has previously been produced.

CPACT News, Edition No. 4, Spring 2002, Page 2, describes, under the heading of "Process Monitoring and Control—A Collaborative CPACT Project", a method for monitoring and control of batch processes in which a number of process variables, such as temperature, speed of agitation and pH value are measured, from which, by applying the technique of MSPC (Multivariate Statistical Process Control), a fingerprint of the batch process is obtained in the form of a trajectory, i.e. a process graph curve, in a multivariate control chart. By comparing the trajectory of the current batch process with trajectories of earlier processes which have progressed well or badly for known reasons the progress of the current process can be assessed and if necessary timely corrective intervention into the process can be undertaken. In such cases however multivariate control charts only provide starting points for any necessary intervention into the process; the details of how the corrective intervention is to proceed are not specified.

From Helen E. Johnson et al.: "High-Throughput Metabolic Fingerprinting of Legume Silage Fermentations via Fourier Transform Infrared Spectroscopy and Chemometrics" in Applied and Environmental Microbiology, Vol. 70, No. 3, March 2004, pages 1583-1592, it is known that, to determine the fingerprint of silage produced by anaerobic fermentation during the batch process, spectra in the near or mid infrared range are recorded and the volume of data obtained in such cases is compressed by applying PCA (Principal Component Analysis). With principle component analysis a transformation of the high-dimensional spectra into a low-dimensional principle component region is undertaken, in which case as little as possible of the variance, i.e. the information content of the spectra is lost.

It is known from Pia Jorgensen et al.: "On-line batch fermentation process monitoring (NIR)-introducing 'biological process time'" in Journal of Chemometrics, 2004, No. 18, pages 1-11, that a batch process can be monitored online in a fermenter by recording spectra in the near infrared range, where necessary in conjunction with additional fluorescence analysis or mass spectroscopy. By using Partial Least Squares (PLS) regression or primary component analysis on the spectrum, trajectories are obtained in multivariate control charts, which when compared with trajectories from earlier batch processes, make possible an online assessment of the current process with the option of corrective interventions into the process in the sense of multivariate statistical process control.

The multivariate analysis of batch processes by means of NIR spectrometry and primary component analysis is also known from the publication "The Complete Multivariate Solution for PAT" from Umetrics AB. Here too only online information showing whether the current batch process is running normally or is deviating from its normal course is supplied. In the case of a process which is not running in the optimum way this information merely provides starting points for a manual intervention into the process.

The principle of online control of a fermentation process as a function of the course of a process identified from the spectrum in the near infrared range is known from the Siemens press release entitled "Siemens Process Automation Improves Biotech Production with New Analytical Technology" dated 27 May 2002. The "PathFinder", "INCA" and "Presto" products from IPCOS are given as software tools to be considered for this purpose. The first two software tools mentioned make it possible to control a process along an optimum trajectory which is determined via a process model. "Presto" is what is known as a soft(ware) sensor which makes use of measuring signals which are not directly related to a desired process variable (target variable) to quantify the target variable by means of a complex mathematical model. Since the physiological state and the behavior of the micro-organisms can hardly be predicted, bioprocesses can barely be modeled or only modeled with great difficulty.

SUMMARY OF INVENTION

The object of the invention is to allow online regulation of batch processes in a bioreactor.

According to the invention the object is achieved by the method and by the arrangement specified in the claims.

Advantageous developments of the inventive method or of the inventive arrangement are specified in the subclaims.

In accordance with the invention a fingerprint of the process in the form of an actual trajectory is thus determined in the principle component region by a spectrometry observation of the current batch process in the near infrared range and application of principle component analysis to the recorded spectra. The current measuring vector of the actual trajectory at the present time is compared to the corresponding vector of a nominal trajectory, which represents a batch process which has run well in the past (golden batch), so that a deviation of the current measuring vector from the corresponding vector of the nominal trajectory indicates a unsatisfactory process run. Depending on the deviation determined, an adjustment is made online and automatically to the batch process, but with a corridor surrounding the nominal trajectory sensibly being provided, within which a deviation will be tolerated without an adjustment operation being performed. A conventional deterministic controller cannot be used to determine the adjustment operation to be performed, since a reproducible relationship between the available adjustment variables, such as temperature, pH value, oxygen feed and agitation speed, and the regulation variable, here the NIR spectrum or the fingerprint of the process derived from it, is known. This relationship is likely to be strongly non-linear and time-variant over the course of the process. Thus, in accordance with the invention, a control operation is initially performed on the process for trial purposes and its effect is assessed with reference to the resulting change in the deviation between the measuring vector and the vector of the nominal trajectory. If this adjustment operation has produced an improvement, the direction, e.g. the leading sign of the adjustment operation, is retained; if not, the direction is changed, e.g. reversed. If the subsequent adjustment operations, possibly with multiple changes in direction, do not lead to any improvement, the batch process can be terminated prematurely and the batch can be discarded.

The direction of the adjustment operation is preferably determined through numerical optimization using a local search process, especially the Hooke-Jeeves method. This operates according to the principle of sampling and progressing. A small sampling step is undertaken in each direction, the improvement or deterioration of which serves as a partial derivation; the method is then progressed. The advantage of this method is that the derivation does not have to be known.

The adjustment operations determined are undertaken using conventional control devices in the open-loop controls or closed-loop controls for regulating or controlling the process variables such as temperature, oxygen feed and/or speed of agitation. On the basis of the deviation determined between the current measuring vector and the corresponding vector of the nominal trajectory, an individual adjustment operation, e.g. changing the temperature, or a combination of different adjustment operations, e.g. changing the temperature and the oxygen feed, can be undertaken. The required adjustment operations are undertaken during the overall execution sequence of the batch process for each of the recording times of the NIR spectrum, so that an online regulation of the batch process is produced from this. The requirement is naturally that the reaction of the batch process to the adjustment operations is rapid by comparison with its overall duration.

If the respective adjustment operation undertaken proves to be successful, it can be increased for rapid reduction of any deviations still outstanding. This is preferably done, as the deviation becomes less from one point in time to the other point in time, by setting the strength of the adjustment operation as a function of the speed of change of the deviation.

In order to achieve an ongoing optimization of the online regulation, sequences of successful adjustment operations, i.e. those leading to a reduction of the deviation, are stored together with the associated measuring vectors; During the current batch process the created measuring vectors are investigated to see if they match those of the stored sequences and start values for the direction of the adjustment operation currently required are determined as a function thereof. Successful interventions into the process are learnt in this manner and employed in comparable situations.

BRIEF DESCRIPTION OF THE DRAWINGS

For further explanation of the invention reference is made below to the figures of the drawing; the individual figures show.

DETAILED DESCRIPTION OF INVENTION

Figure 1:
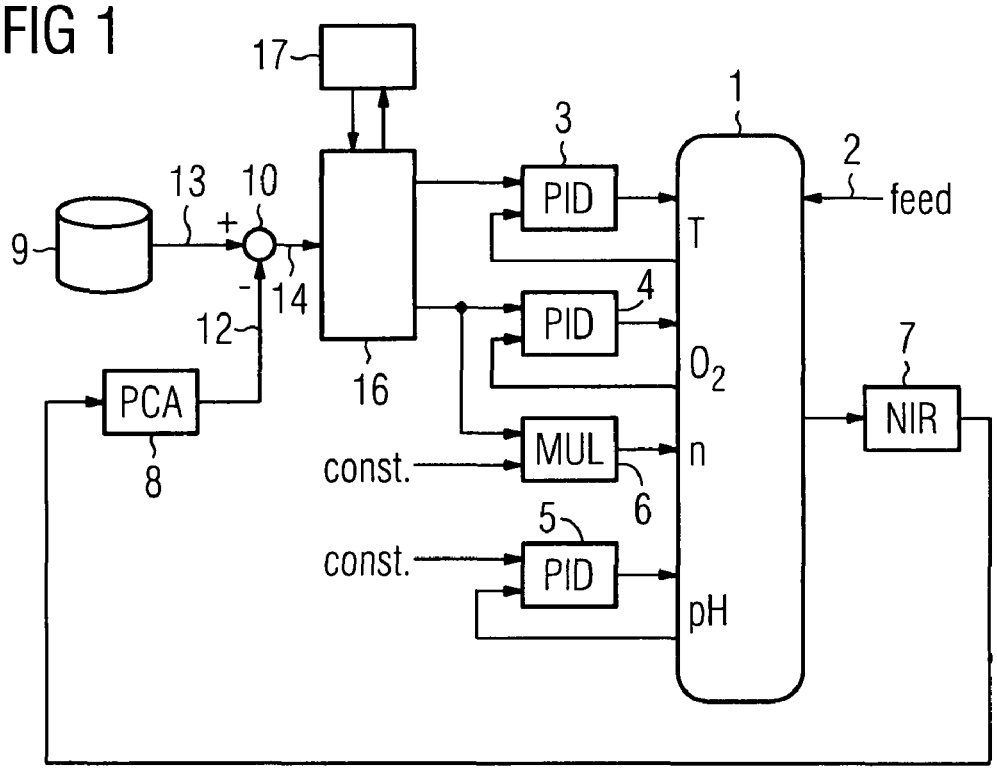
FIG. 1 a simplified block diagram of the inventive arrangement.

FIG. 1 shows a bioreactor 1, in which raw materials (feed) 2 supplied at the beginning of the batch process are converted with the aid of micro-organisms into a desired product of the desired quality. During the batch process adjustment operations in the process are used to create optimum environmental conditions for the micro-organisms. The adjustment operations are performed using conventional control devices in the form of open-loop controls or closed-loop controls. In the exemplary embodiment shown the temperature T and the oxygen feed $O_2$ are regulated the aid of PID controllers 3 and 4 depending on nominal values, while the pH-value is regulated by means of a further PID controller 5 to a constant value. The rotational speed n for an agitator not shown in the diagram in the bioreactor 1 can be controlled in proportion to the oxygen feed, to which end the nominal value for the regulation of the oxygen feed can be multiplied in a multiplier 6 by a multiplication factor.

The adjustment operations are undertaken here not as previously on the basis of empirical values, but within the framework of an online regulation based on the actual course of the process which is identified in the sense of a fingerprint. To this end an NIR spectrometer 7 is used to record, at regular consecutive points in time $t_k$, k=1 ... max, spectra of the batch in the reactor 1 in the near infrared range. To compress the volume of data without loss of information each recorded high-dimensional spectrum is transformed in a device 8 by primary component analysis into a measuring vector in a low-dimensional primary component region. The measuring vectors created at all points in time $t_1$ to $t_{max}$ form an actual trajectory, that is a typical curve for the course of the batch process, which can thus be viewed as a fingerprint of the process. The trajectory of a previous batch process running in the optimum manner, in which the product concerned has been produced with better quality, is stored as a nominal trajectory in a data memory 9. In a comparison device 10 at each point in time $t_k$ the current measuring vector 12 of the actual trajectory and the associated vector 14 of the nominal trajectory are compared to each other, with a deviation 13 between the two vectors 12, 14 indicating that the course of the current process is not optimized.

Figure 2:
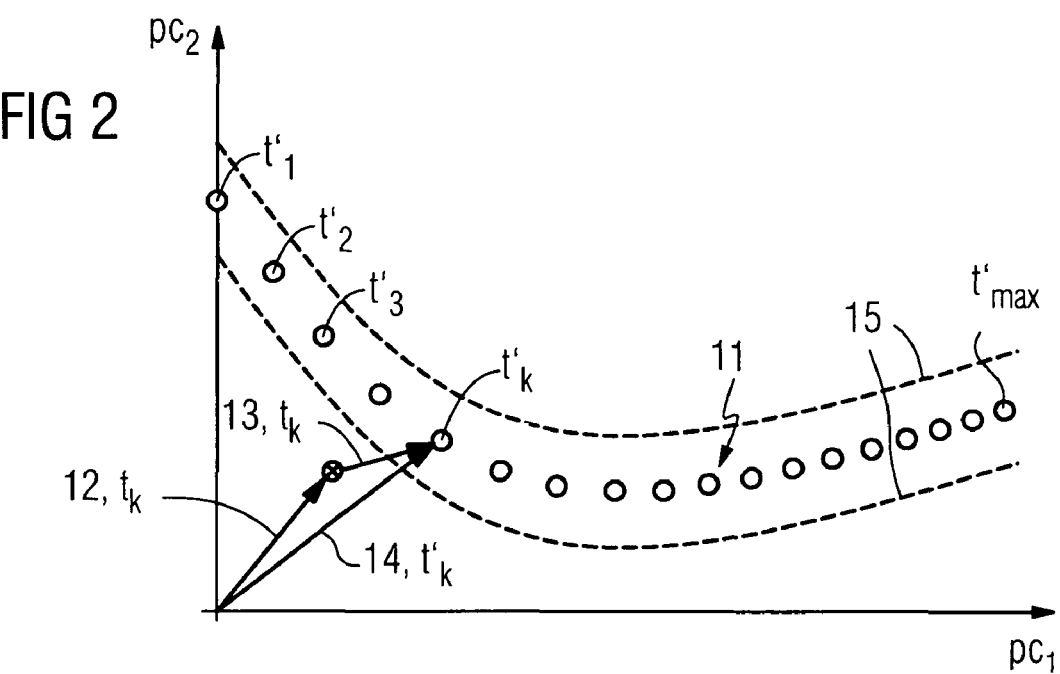
FIG. 2 an example for comparing the current measuring vector with the corresponding vector of the nominal trajectory.

FIG. 2 shows an example of a nominal trajectory 11 in a two-dimensional primary component region with the primary components $pc_1$ and $pc_2$, which consists of the peaks of the measuring vectors generated in the earlier, optimally executing process at the given points in time $t'_1$ to $t'_{max}$. The measuring vector 12 generated at point in time $t_k$ and its deviation 13 from the corresponding vector 14 of the nominal trajectory 11 are shown as examples for the current batch process. A corridor 15 is defined around the nominal trajectory 11 within which deviations 13 of the current measuring vector 12 from the corresponding vector 14 of the nominal trajectory 11 are viewed as insignificant. If the current measuring vector 14 with its peak lies outside the corridor 15, a corrective adjustment operation is required in the batch process.

The necessary corrective adjustment operation is determined in a device 16 and fed here in the form of nominal values to the PID controllers 3 and 4. In this case the process variables T and $O_2$ will initially be changed into a direction predetermined as start value. If, in this case, at the subsequent point in time $t_{k+1}$ a reduction of the deviation 13 is produced, the direction of the adjustment operation is retained and the adjustment operation is increased to further reduce the deviation 13. If, on the other hand, at point in time $t_{k+1}$ no reduction of the deviation 13 is produced, the direction of the adjustment operation is changed. In this case a local search method, e.g. the Hooke-Jeeves method, is employed.

To find a suitable start value as quickly as possible, sequences of successful adjustment operations, i.e. those leading to a reduction in the deviation 13, are stored together with the associated measuring vector 12 in an optimization device 17. During the current batch process the created measuring vectors 12 are investigated to see whether they match those of the stored sequences and, depending on the result, a promising start value for the direction of the current required adjustment operation is determined.

The invention claimed is:

1. A method for online regulation of a batch process in a bioreactor, comprising:
   recording high-dimensional spectra of a current batch by near-infrared range (NIR) spectrometry in the bioreactor at consecutive points in time during the batch process;
   creating a measuring vector for each spectrum in a low-dimensional primary component region through a primary component analysis of the high-dimensional spectra;
   determining a deviation between the measuring vector and a corresponding vector of a nominal trajectory which consists of measuring vectors of a reference batch determined in an earlier batch process;
   determining an adjustment operation for the batch process based on the deviation; and
   executing the adjustment operation in the batch process, wherein the direction of the adjustment operation is retained if the deviation determined from one point in time to another point in time is lower, and the direction of the adjustment operation is changed if the deviation determined from one point in time to another point in time remains the same or is greater.

2. The method as claimed in claim 1, wherein the direction of the adjustment operation is determined by a local search method.

3. The method as claimed in claim 1, wherein the direction of the adjustment operation is determined by a Hooke-Jeeves method.

4. The method as claimed in claim 1, wherein the strength of the adjustment operation is determined as a function of the speed of change of the deviation for a deviation that becomes lower from one point in time to the other point in time.

5. The method as claimed in claim 1, wherein a sequences of adjustment operations leading to a reduction of the deviation are stored along with the associated measuring vectors, that during the current batch processes the created measuring vectors are compared for a match to those of the stored sequences, and, depending on the result, start values are determined for the direction of the adjustment operation.

6. A system for online regulation of a batch processes in a bioreactor, comprising:
   an near-infrared range (NIR) mass spectrometer that records spectra of the current batch in the bioreactor at consecutive points in time during an ongoing batch process;
   an analysis device for primary component analysis of a high-dimensional spectra;
   a creating device for creating a measuring vector for each spectrum in a low-dimensional primary component region;
   a determining device for deter mining a deviation between the measuring vector and a corresponding vector of a nominal trajectory that consists of a measuring vector of a reference batch determined from a previous batch process;
   an adjustment determining device for determining an adjustment operation for the batch process depending on the deviation; and
   a control device for executing the adjustment operation in the batch process, wherein the direction of the adjustment operation is retained if the deviation determined from one point in time to the other point in time is lower, and with the direction of the adjustment operation being changed if the deviation determined from one point in time to the other point in time remains the same or is higher.

7. The system as claimed in claim 6, wherein the device determines the direction of the adjustment operation via a local search method.

8. The system as claimed in claim 6, wherein the device determines the direction of the adjustment operation by a Hooke-Jeeves method.

9. The system as claimed in claim 6, wherein the strength of the adjustment operation is determined as a function of the speed of change of the deviation for a deviation that becomes lower from one point in time to the other point in time.

10. The system as claimed in claim 6, further comprising an optimization device that:
    stores sequences of adjustment operations leading to a reduction of the deviation together with the associated measuring vector,
    compares the measuring vectors created during of the current batch process to those of the stored sequences, and
    determines start values for the direction of the adjustment operation based on the comparing.

* * * * *